June 14, 1927.

C. H. WILSON 1,632,360

ARMORED TRUCK FOR TRANSPORTING VALUABLES

Filed May 21, 1924     3 Sheets-Sheet 2

Inventor

C.H. Wilson.

By Lacey & Lacey, Attorneys

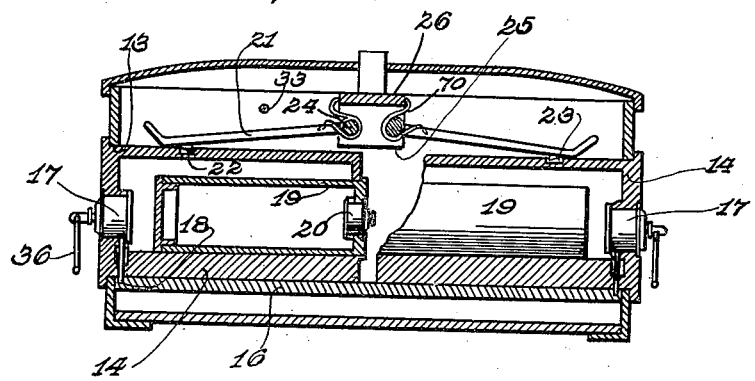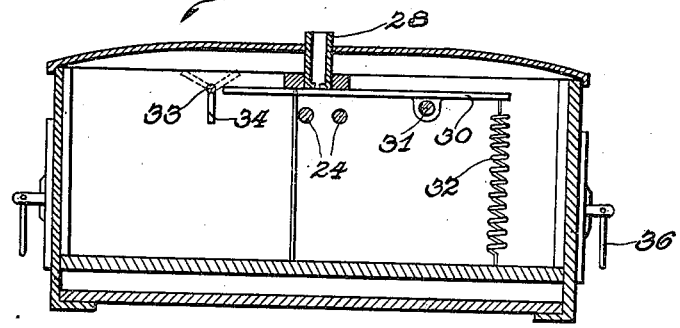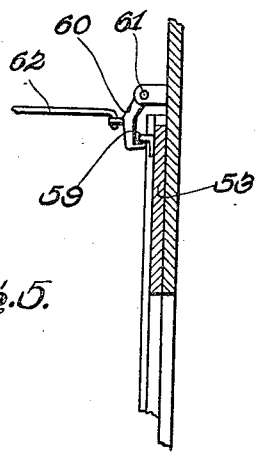

Patented June 14, 1927.

1,632,360

UNITED STATES PATENT OFFICE.

CALVIN H. WILSON, OF McCRACKEN, KANSAS.

ARMORED TRUCK FOR TRANSPORTING VALUABLES.

Application filed May 21, 1924. Serial No. 714,960.

The present invention relates to an improved truck intended for safely carrying valuables such as currency, jewelry, and the like, between banks, postoffices, express offices, and the like.

The main object of the invention is to provide a truck in which the driver thereof will be enabled to instantly close all the doors and windows in the cab of the truck to protect himself from outside attack and to carry boxes for valuables which are secured in position by a locking device operated from inside of the cab in addition to a lock to which the cashier of a bank, for instance, has the key, while a third lock is further provided also securing the box in the truck and to which the driver has the combination.

Another object of the invention is to furnish means by which the driver can send out distress signals in case he should be attacked, after he has closed all access to the cab.

Figure 1:
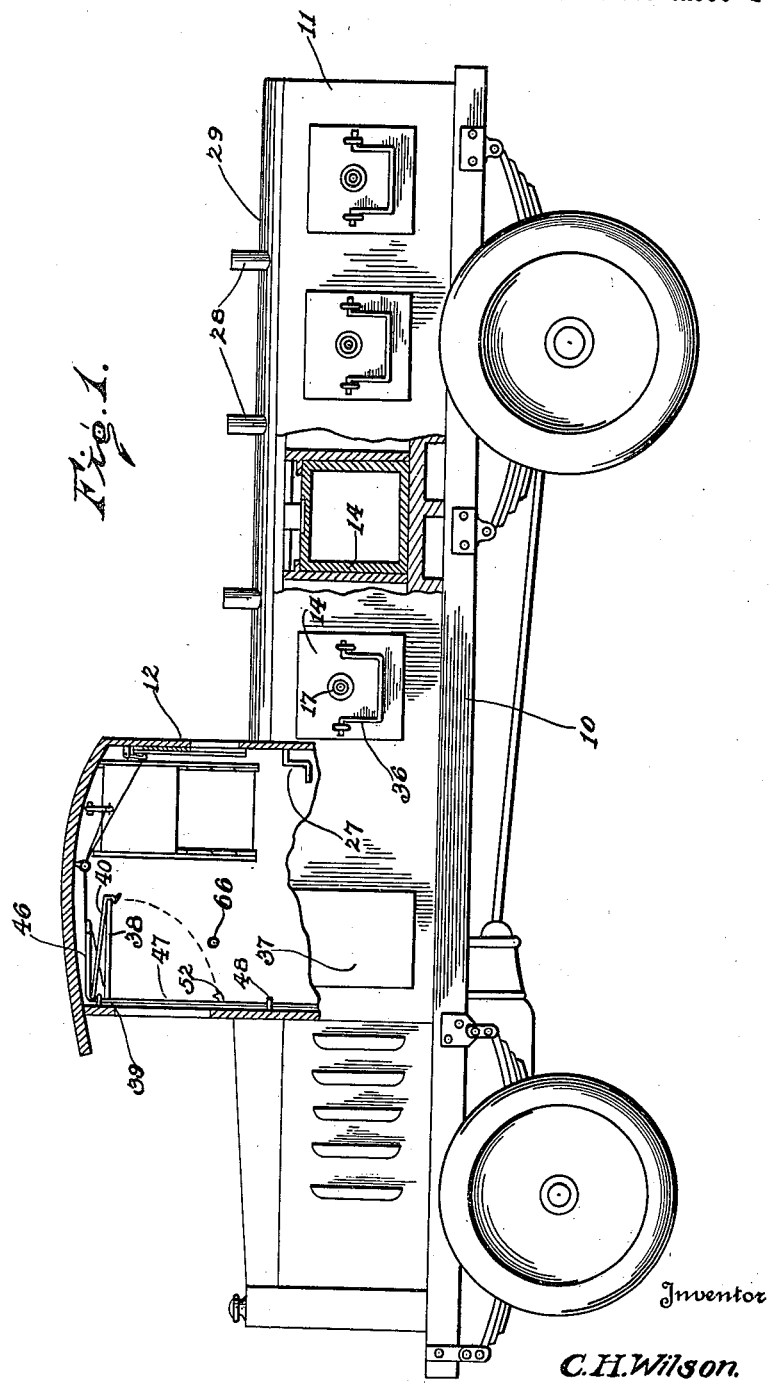
Figure 2:
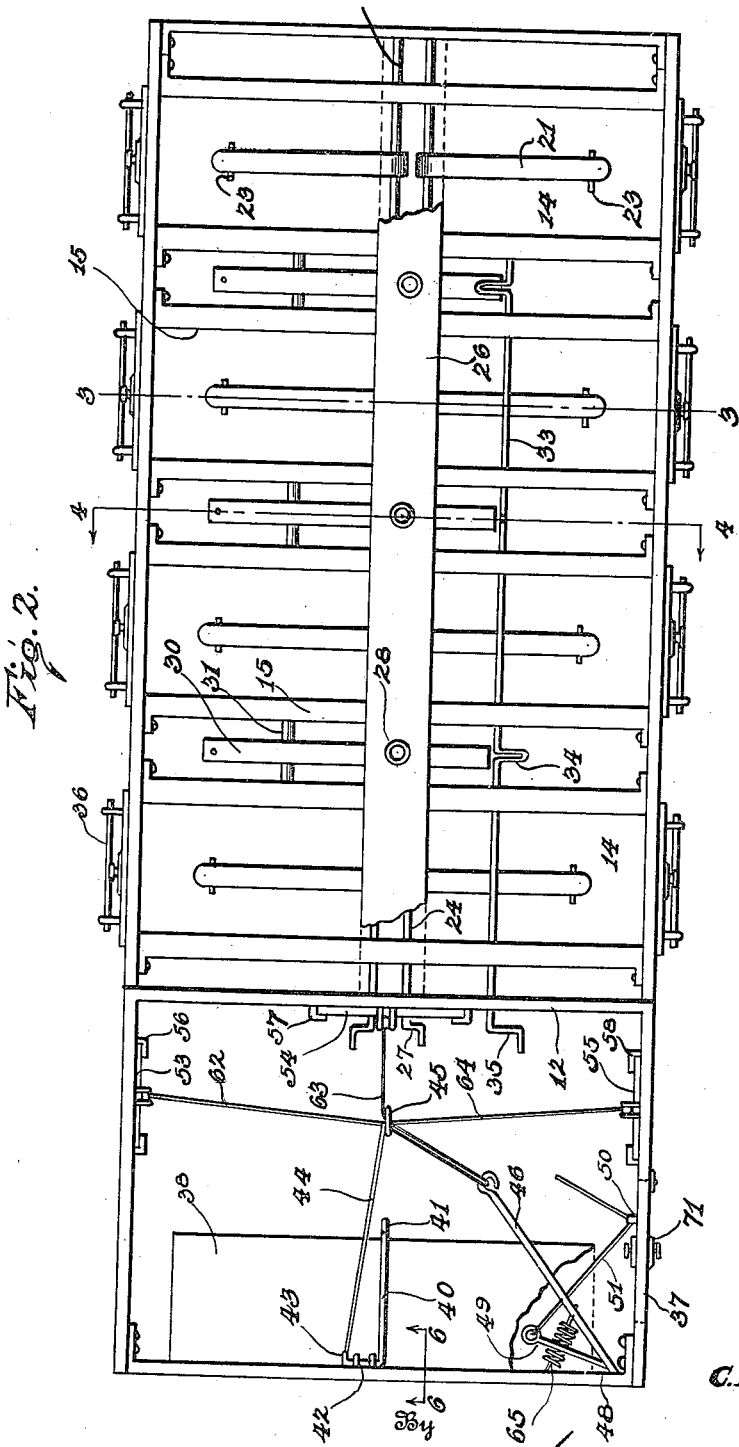

In the accompanying drawings, one embodiment of the invention is illustrated and:

Figure 1 is a side elevation, partly in section, of a wheeled truck embodying the subject matter of the present invention, Figure 2 is a top plan view of Figure 1 on a somewhat larger scale, with the roof of the truck removed, Figure 3 is a transverse section along line 3—3 of Figure 2, Figure 4 is a transverse section along line 4—4 of Figure 2, Figure 5 is a view in side elevation illustrating the latch employed for one of the shutters of the cab windows, Figure 6 is a fragmentary section along line 6—6 of Figure 2.

In the drawings, the reference numeral 10 indicates the chassis of a wheeled truck of any suitable type and on which the truck body 11 and cab 12 of my invention are erected. The truck body and cab are constructed of suitable armor plate so as to make the truck bullet-proof.

The truck body 11 is provided with a number of preferably square openings or cells 13 in each of its sides adapted to receive suitable cash boxes 14. In the drawings, four of these openings are shown but it is evident that a greater number may be employed and that the size of the boxes and cells may be varied to suit conditions. The cash boxes fit snugly between guides 15 extending transversely of the truck body and rest on the truck bottom 16. The length of each box is approximately half of the width of the truck so that the inner ends of two oppositely positioned boxes nearly meet in the middle of the truck, as best seen in Figure 3. Each box is provided with a combination lock 17 for the use of the driver and this lock operates a bolt or dog 18 engaging in a corresponding aperture in the bottom 16 of the truck so that in order to remove a box, the driver must first operate the combination lock 17 to disengage the dog 18 from the truck bottom 16.

Within the cash box fits snugly a receptacle 19 preferably in the form of a metal cartridge and adapted to be locked by means of a combination lock 20. This second combination lock can only be operated by the cashier of the bank, for instance, from which the truck is sent and by the cashier at the receiving bank. By this arrangement, a double measure of safety is secured for the valuables contained in the cash box. Furthermore, each box is furnished with a hinged handle 36 for facilitating the removal of the box from the truck. A third device is provided for the security of the cash box on the truck, namely; a lever 21 having a toe 22 pressed down by a spring 70 in a corresponding notch 23 in the top of the box. It will thus be seen that even though the combination lock 17 has been unlocked, the box will still be held securely on the truck. Each of the levers 21 is carried on a longitudinally extending shaft 24 mounted in suitable bearings 25 on the under side of a longitudinal bar 26 extending from end to end of the truck body. This shaft projects into the cab and terminates with a handle 27. Preferably, one shaft 24 is provided for each set of levers 21; that is to say, one shaft for the left hand levers and another shaft for the right hand levers, and, of course, each shaft is provided with one of the handles 27. It will now be evident that by turning the handle 27, the operator may, from the inside of the cab, disengage the cash boxes. In some instances, it may be found preferable to provide the handle 27 with a numbered dial, one number for each cash box, and a series of cams on the shaft, so that only one of the levers 21 may be lifted at a time.

In the longitudinal bar 26 are secured a number of short barrels 28 which extend upwardly through the roof 29 of the truck body. Each of these barrels is intended to receive an appropriate sky rocket or any other suitable signal which will rise from the truck when set off and not only give a report but also display a light indicating that the truck is being attacked. In order to ignite the rockets, triggers 30 are furnished, these triggers being fulcrumed, as at 31, in the guides 15 of the cash boxes, and a tension spring 32 of sufficient strength to set off the rocket is secured to the bottom of the truck as well as to the rear end of each trigger 30, as best seen in Figure 4. Each of the triggers extends transversely under one of the barrels 28 and the free end thereof is operated by a cocking rod 33 which extends along the greater length of the truck and is mounted to turn in the guides 15. Opposite each of the triggers the cocking rod is provided with a finger 34 which, when the rod is turned will engage the trigger for thus pressing the end thereof downwardly against the tension of the spring 32 and when the finger 34 has passed the end of the trigger, the latter will be released and strike the fulminating cap of the rocket a sharp blow, in this manner setting it off. In this connection, it should be noted that the fingers 34 are preferably staggered on the cocking rod 33 so that the rockets are set off at different times. Accordingly, by turning the crank 35 extending into the cab 12, the driver may set off only one of the rockets, or he may set off the whole series of rockets, one after the other.

Beside the usual entrance door 37 having a combination lock 71 operable from both sides, the cab 12 is furnished with front, side and rear shutters for the cab windows. The front window has a shutter 38 which is preferably hinged, as at 39, above said window, and is normally held in raised position, as indicated in Figures 1, 2, and 6. For this purpose, an arm 40 is provided above the shutter, which arm terminates with a hook 41 adapted to engage the edge of the shutter when the latter is raised and hold it in raised position. The arm 40 is hinged, as at 42, on the front wall of the cab and has a short lever 43 connected by means of a cable 44 running through a pulley or eyelet 45 and secured to the outer end of a main lever 46. This main lever 46 has an upright stem 47 carried in suitable bearings 48, preferably in one corner of the cab, as best seen in Figures 1 and 2. The lower end of this stem has a short lever 49 which connects to a pulley or eyelet 50 near the floor of the cab by means of a cable 51. The free end of this cable is intended to be jerked by the driver when he wishes to close the shutters and it is evident that the arrangement can easily be changed so that the lever 49 may be operated by a foot pedal. At 52 is shown a catch which is adapted to snap over the edge of the shutter 38 when the latter is in closed position, to prevent the opening of the shutter from the outside by an unauthorized person.

The shutters for the sides and back of the cab may also be hinged in a manner similar to the front shutter 38 but are preferably made slidable in suitable guides and in vertical direction. These shutters, indicated by the numerals 53, 54 and 55, are accordingly slidably mounted in suitable guides 56, 57 and 58 furnished on the side and rear walls of the cab. When in raised position, the shutter 53 (see Figure 5) is supported by means of a ledge 59 secured thereon near its upper edge, by a hook 60 fulcrumed, as at 61, on the side wall of the cab. This hook is connected by means of a cable 62, running through the pulley or eyelet 45 to the end of the main lever 46, and similarly, cables 63 and 64 for the windows 54 and 55 respectively, are also connected with the main lever 46. It will thus be evident that by pulling on the cable 51 and thus swinging the short lever 49 with the main lever 46, all the shutters will be simultaneously released and all the windows closed by a single operation. Latches similar to the spring latch 52 are also furnished for the side and rear shutters. A tension spring 65, having its ends secured in the front wall of the cab and on the main lever 56, tends to hold the lever in the position shown in Figure 2, that is to say: in position to permit the locking of the shutters when open.

If it should happen that the driver is attacked when taking the truck from one bank to another, the first thing for him to do will be to pull the cable 51 and, in this manner, close all the windows by their respective shutters, the main entrance door 37 being previously closed and locked. His next duty will be to send off one or more distress signals which can be accomplished from within the cab by turning the crank 35, which crank will operate the triggers 30 to set off the signal rockets. He may thereupon calmly await assistance from passersby or the police and may even, if armed, fire at the attacking party through the sight openings 66 furnished at suitable points about the cab.

When the driver has arrived at his destination, he will turn the handle 27 and in this manner raise one or more of the levers 21 to release the cash boxes 14. When this is done, he manipulates the combination lock 17 to release the bolt 18, when the cash box can be removed and taken into the bank. The cash box remains closed until taken care of by the cashier who will then open it by manipulating the combination lock 20.

Having thus described the invention, what I claim is:

1. An armored truck comprising a cab and a body portion constructed of bullet-proof sheet metal, said body portion being provided with cells opening through the sides thereof, a safety box fitting in each of said cells, and means for locking each box in position; said means including a lever adapted to grip the box, a rotary shaft carrying said lever, and means in said cab for rotating said shaft and moving the lever to a releasing position.

2. An armored truck comprising a cab and a body portion constructed of bullet-proof sheet metal, said body portion being provided with cells opening through the sides thereof, a safety box fitting in each of said cells, and means for locking each box in position, said locking means including a lock at the outer end of the box having a bolt engaging in the body portion and further including a lever adapted to grip the box, a shaft rotatably mounted in said body, said shaft extending longitudinally in the body and having said lever rigidly carried thereby and extending transversely therefrom, and an element in said cab for rotating said shaft and moving the lever to a releasing position.

3. An armored truck comprising a cab and a body portion constructed of bullet-proof sheet metal, said body portion being provided with cells opening through the sides thereof, a safety box fitting in each of said cells, and means for locking each box in position, said locking means including a lever adapted to grip the box, a shaft rotatably mounted in said body longitudinally thereof and having said lever extending transversely therefrom, and means in said cab for rotating said shaft and moving the lever to a releasing position.

4. A vehicle comprising a cab and a body portion having a side wall formed with an opening, a receptacle slidable into and out of said body through the opening in its side, said receptacle having an upper wall formed with a socket, a shaft extending longitudinally in said body above said receptacle, said shaft being rockably mounted and having a portion projecting into said cab and provided with turning means, an arm extending transversely from said shaft above and longitudinally of said receptacle and provided with a tooth adapted to fit into said socket to secure the receptacle against outward movement, and means yieldably resisting rotation of said shaft in a direction to lift said arm and release said receptacle.

In testimony whereof I affix my signature.

CALVIN H. WILSON.